US009042394B2

(12) United States Patent  
Lin

(10) Patent No.: US 9,042,394 B2  
(45) Date of Patent: May 26, 2015

(54) WIRELESS TRANSMISSION METHOD

(75) Inventor: Chien-Nan Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 499 days.

(21) Appl. No.: 13/479,042

(22) Filed: May 23, 2012

(65) Prior Publication Data

US 2013/0016704 A1    Jan. 17, 2013

(30) Foreign Application Priority Data

Jul. 15, 2011    (TW) .............................. 100125116 A

(51) Int. Cl.  
*H04L 12/28* (2006.01)  
*G06F 3/038* (2013.01)  
*H04W 72/04* (2009.01)

(52) U.S. Cl.  
CPC ........... *G06F 3/038* (2013.01); *H04W 72/0446* (2013.01)

(58) Field of Classification Search  
None  
See application file for complete search history.

(56) References Cited

U.S. PATENT DOCUMENTS 8,391,193 B2 *   3/2013   Sugaya .................... 370/310  
2009/0102786 A1 *   4/2009   Lin et al. .................. 345/156

* cited by examiner

*Primary Examiner* — Kwang B Yao  
*Assistant Examiner* — Hardikkumar Pael  
(74) *Attorney, Agent, or Firm* — Kirton McConkie; Evan R. Witt

(57) ABSTRACT

A wireless transmission method is provided for allowing data transmission between plural wireless devices. In the wireless transmission method, each time cycle is divided into a flag time segment and a transmission time segment. The flag time segment includes plural flag time slots corresponding to respective wireless devices, and the transmission time segment includes plural transmission time slots. After the plural wireless devices are synchronized with each other, the wireless device for transmitting data issues a transmission request during the corresponding flag time slot. In response to the transmission request, a corresponding wireless device issues an assigning command during the corresponding flag time slot. The wireless device issuing the transmission request will transmit data during a transmission time slot assigned by the assigning command. In accordance with the wireless transmission method, each of the plural wireless devices has transmitting and receiving capability.

8 Claims, 8 Drawing Sheets

WIRELESS TRANSMISSION METHOD

FIELD OF THE INVENTION

The present invention relates to a wireless transmission method, and more particularly to a wireless transmission method using a home radio frequency (HRF) technology.

BACKGROUND OF THE INVENTION

With rapid development of science and technology, computers and the peripheral devices thereof become essential in our daily lives. Conventionally, a computer and the peripheral devices thereof are established and in communication with each other via wire linkage. The processes of storing and managing the connecting wires for these electronic devices are somewhat troublesome to the users. Moreover, the wire linkage between the computer and the peripheral devices is restricted by the length of the connecting wire. For solving these drawbacks, a variety of wireless computer peripheral devices are developed to transmit signals according to a wireless transmission technology. These wireless computer peripheral devices are collaboratively defined as a wireless transmission system. Since these wireless computer peripheral devices transmit signals according to the wireless transmission technology, the drawbacks arising from the connecting wires will be avoided. The wireless computer peripheral devices include for example wireless mice, wireless earphones, wireless keyboards, wireless audio devices, and the like. For example, the wireless transmission technology is a home radio frequency (HRF) technology.

Hereinafter, the architecture of a wireless transmission system will be illustrated by referring to a computer system operated according to the wireless transmission technology. FIG. 1 schematically illustrates the architecture of a conventional wireless transmission system. As shown in FIG. 1, the conventional wireless transmission system 1 comprises a computer host 10, a wireless mouse 11 and a wireless keyboard 12. A wireless signal receiver 13 is connected to the computer host 10. The wireless mouse 11 has a wireless mouse controlling unit 111. The wireless mouse controlling unit 111 is configured for controlling the wireless mouse 11 to issue a wireless mouse signal WS11 to the wireless signal receiver 13. The wireless keyboard 12 has a wireless keyboard controlling unit 121. The wireless keyboard controlling unit 121 is configured for controlling the wireless keyboard 12 to issue a wireless keyboard signal WS12 to the wireless signal receiver 13. The wireless mouse controlling unit 111 and the wireless keyboard controlling unit 121 are both wireless device microchips. In addition, the wireless mouse controlling unit 111 and the wireless keyboard controlling unit 121 are set to output the wireless mouse signal WS11 and the wireless keyboard signal WS12 to the wireless signal receiver 13, respectively. In response to the wireless mouse signal WS11 and the wireless keyboard signal WS12, the computer host 10 executes corresponding functions.

In a case that only the wireless mouse 11 is operated, the wireless mouse 11 generates the wireless mouse signal WS11 to the wireless signal receiver 13. In response to the wireless mouse signal WS11, the computer host 10 executes a corresponding function. Whereas, in a case that the wireless mouse 11 and the wireless keyboard 12 are simultaneously operated, the wireless mouse signal WS11 issued by the wireless mouse 11 and the wireless keyboard signal WS12 issued by the wireless keyboard 12 are possibly transmitted to the wireless signal receiver 13 at the same time. Under this circumstance, a so-call data collision problem occurs between the wireless mouse signal WS11 and the wireless keyboard signal WS12. Due to occurrence of the data collision problem, either or both of the wireless mouse signal WS11 and the wireless keyboard signal WS12 fail to be successfully received by the wireless signal receiver 13. For continuously performing wireless transmission when the data collision problem occurs, a synchronous wireless transmission system has been proposed.

Hereinafter, a conventional wireless transmission method will be illustrated with reference to the wireless transmission system of FIG. 1 and the timing waveform diagram of FIG. 2. FIG. 2 schematically illustrates the timing of generating related signals in the conventional wireless transmission system. In FIG. 2, three clock diagrams CLK13, CLK11 and CLK12 are shown. The clock diagram CLK13 indicates the action of the wireless signal receiver 13. The clock diagram CLK11 indicates the action of the wireless mouse 11. The clock diagram CLK12 indicates the action of the wireless keyboard 12. The operations of the components of the wireless transmission system 1 will be described as follows. The wireless signal receiver 13 that is connected to the computer host 10 will periodically issue a notification signal DS in every notification time interval Td. When the wireless mouse 11 or the wireless keyboard 12 is notified by the notification signal DS, the wireless mouse 11 or the wireless keyboard 12 is permitted to issue the wireless mouse signal WS11 or the wireless keyboard signal WS12. In addition, after one notification signals DS has been generated for a receipt time interval Tr, a next notification signals DS is generated. If the wireless mouse signal WS11 or the wireless keyboard signal WS12 is received by the wireless signal receiver 13 during the receipt time period Tr, the wireless signal receiver 13 issues a responding signal RS to the wireless mouse 11 or the wireless keyboard 12. The responding signal RS includes a time segment report signal (not shown) and a receipt confirming signal (not shown). In response to the time segment report signal, the wireless mouse 11 or the wireless keyboard 12 will realize that the wireless mouse signal WS11 or the wireless keyboard signal WS12 is received by the wireless signal receiver 13 during a specified receipt time segment. In response to the receipt confirming signal, the wireless mouse 11 or the wireless keyboard 12 will confirm that the wireless mouse signal WS11 or the wireless keyboard signal WS12 has been received by the wireless signal receiver 13. Each receipt time interval Tr includes a first receipt time segment Tsr1 and a second receipt time segment Tsr2. The wireless mouse signal WS11 is received by the wireless signal receiver 13 during the first receipt time segment Tsr1. The wireless keyboard signal WS12 is received by the wireless signal receiver 13 during the second receipt time segment Tsr2.

For preventing data collision of the wireless transmission system 1 during the wireless transmission, the wireless mouse controlling unit 111 is set to control the wireless mouse 11 to generate the wireless mouse signal WS11 during a preset first receipt time segment, and the wireless keyboard controlling unit 121 is set to control the wireless keyboard 12 to generate the wireless keyboard signal WS12 during a preset second receipt time segment. In the initial stage, before the wireless mouse 11 and the wireless keyboard 12 are in communication with the wireless signal receiver 13, the wireless mouse 11 fails to realize whether there is a time difference between the preset first receipt time segment of the wireless mouse controlling unit 111 and the first receipt time segment Tsr1 of the wireless signal receiver 13. Similarly, before the wireless mouse 11 and the wireless keyboard 12 are in communication with the wireless signal receiver 13, the wireless keyboard 12 fails to realize whether there is a time difference between the preset second receipt time segment of the wireless keyboard controlling unit 121 and the second receipt time segment Tsr2 of the wireless signal receiver 13. In other words, the wireless mouse 11 and the wireless keyboard 12 fail to realize whether the timing of generating the wireless mouse signal WS11 and the wireless keyboard signal WS12 comply with the first receipt time segment Tsr1 and the second receipt time segment Tsr2.

Then, the wireless keyboard 12 generates the wireless keyboard signal WS12 during the preset second receipt time segment of the wireless keyboard controlling unit 121, and the wireless mouse 11 generates the wireless mouse signal WS11 during the preset first receipt time segment of the wireless mouse controlling unit 111. As shown in FIG. 2, the preset second receipt time segment set by the wireless keyboard controlling unit 121 complies with the first receipt time segment Tsr1 of the real receipt time period Tr, and the preset first receipt time segment set by the wireless mouse controlling unit 111 complies with the second receipt time segment Tsr2 of the real receipt time period Tr. That is, the preset first receipt time segment is deviated from the real first receipt time segment Tsr1, and the preset second receipt time segment is deviated from the real second receipt time segment Tsr2.

For correcting the time deviation between the preset first receipt time segment and the real first receipt time segment Tsr1 and the time deviation between the preset second receipt time segment and the second receipt time segment Tsr2 in the wireless transmission system 1, the receiver control unit 131 of the wireless signal receiver 13 will generate the responding signal when the wireless signal is received. That is, when the wireless mouse signal WS11 is received by the wireless signal receiver 13, the responding signal is transmitted to the wireless mouse 11. As mentioned above, the responding signal includes the time segment report signal and the receipt confirming signal. In response to the receipt confirming signal, the wireless mouse 11 or the wireless keyboard 12 will confirm that the wireless mouse signal WS11 or the wireless keyboard signal WS12 has been received by the wireless signal receiver 13. In response to the time segment report signal, the wireless mouse 11 or the wireless keyboard 12 will realize that the wireless mouse signal WS11 is received by the wireless signal receiver 13 during the first receipt time segment Tsr1 and the wireless keyboard signal WS12 is received by the wireless signal receiver 13 during the second receipt time segment Tsr2. When the responding signal is received by the wireless mouse 11, the wireless mouse control unit 111 realizes that the m wireless mouse signal WS11 has been successfully transmitted and the preset first receipt time segment is deviated from the real first receipt time segment Tsr1. Consequently, the mouse control unit 111 will calculate the time difference between the preset first receipt time segment and the real first receipt time segment Tsr1, and adjust the preset first receipt time segment until the preset first receipt time segment and the first receipt time segment Tsr1 are synchronous. Similarly, when the responding signal is received by the wireless keyboard 12, the wireless keyboard control unit 121 will calculate the time difference between the preset second receipt time segment and the second receipt time segment Tsr2, and adjust the preset second receipt time segment until the preset second receipt time segment and the second receipt time segment Tsr2 are synchronous. Under this circumstance, the time of issuing data by the wireless mouse 11 and the time of issuing data by the wireless keyboard 12 are separated from each other, thereby preventing data collision.

Although the conventional wireless transmission system 1 is effective to avoid the data collision problem, there are still some drawbacks during the wireless transmission method is implemented. For example, in the wireless transmission method, only the wireless mouse signal WS11 and the wireless keyboard signal WS12 can be respectively transmitted from the wireless mouse 11 and the wireless keyboard 12 to the computer host 10, but the data transmission between the wireless mouse 11 and the wireless keyboard 12 is not allowable. Nowadays, with increasing development of science and technology, the functions of various electronic devices become more diverse. For example, if the wireless keyboard has a sound volume control function or the wireless mouse may has a display screen, it is important to render the data transmission between respective electronic devices, for example the data transmission between the wireless mouse and the wireless keyboard. Therefore, there is a need of providing a wireless transmission method for allowing data transmission between plural wireless devices.

SUMMARY OF THE INVENTION

The present invention provides a wireless transmission method for allowing data transmission between plural wireless devices.

In accordance with an aspect of the present invention, there is provided a wireless transmission method for use in a wireless transmission system. The wireless transmission system includes plural wireless devices corresponding to respective plural device identification codes for transmitting data during plural time cycles. Firstly, each of the time cycles is divided into a flag time segment and a transmission time segment. The flag time segment includes plural flag time slots corresponding to respective wireless devices. The transmission time segment includes plural transmission time slots. Then, the plural wireless devices are synchronized with each other. Then, a transmission request is issued by a first wireless device of the plural wireless devices during the flag time slot corresponding to the first wireless device. The transmission request contains the device identification code corresponding to a second wireless device of the plural wireless devices. Then, an assigning command is issued by the second wireless device according to the transmission request during the flag time slot corresponding to the second wireless device. The assigning command contains the device identification code corresponding to the first wireless device. Afterwards, the corresponding data is transmitted from the first wireless device to the second wireless device according to the assigning command during an assigned transmission time slot.

In an embodiment, the transmission request is issued by sending plural request signals during the flag time slot corresponding to the first wireless device. According to the flag time slot corresponding to the first wireless device and the device identification code corresponding to the second wireless device, the plural wireless devices excluding the first wireless device judge that the transmission request is issued to the second wireless device by the first wireless device.

In an embodiment, the assigning command contains the transmission time slot assigned by the second wireless device. The assigning command is issued by sending plural assigning signals during the flag time slot corresponding to the second wireless device. According to the plural assigning signals, the plural wireless devices excluding the second wireless device judge that assigned transmission time slot is used.

In an embodiment, the plural request signals and corresponding data are issued by the first wireless device according to a home radio frequency technology, and the plural assigning signals are issued by the second wireless device according to the home radio frequency technology.

In an embodiment, after the transmission request is issued by the first wireless device of the plural wireless devices during the flag time slot corresponding to the first wireless device, the wireless transmission method further includes the following steps. An additional transmission request is issued by a third wireless device of the plural wireless devices during the flag time slot corresponding to the third wireless device, wherein the additional transmission request contains the device identification code corresponding to the first wireless device. Then, an additional assigning command is issued by the first wireless device according to the additional transmission request during the flag time slot corresponding to the first wireless device, wherein the additional assigning command contains the device identification code corresponding to the third wireless device. Afterwards, the corresponding data is transmitted from the third wireless device to the first wireless device according to the additional assigning command during an assigned additional transmission time slot.

In an embodiment, the additional transmission request is issued by sending plural additional request signals during the flag time slot corresponding to the third wireless device. According to the flag time slot corresponding to the third wireless device and the device identification code corresponding to the first wireless device, the plural wireless devices excluding the third wireless device judge that the additional transmission request is issued to the first wireless device by the third wireless device.

In an embodiment, the additional assigning command contains the additional transmission time slot assigned by the first wireless device. The additional assigning command is issued by sending plural additional assigning signals during the flag time slot corresponding to the first wireless device. According to the plural assigning signals, the plural wireless devices excluding the first wireless device judge that assigned additional transmission time slot is used.

In an embodiment, the plural request signals, the plural additional request signals and corresponding data are issued by the first wireless device according to a home radio frequency technology, the plural assigning signals are issued by the second wireless device according to the home radio frequency technology, and the plural additional request signals and corresponding data are issued by the third wireless device according to the home radio frequency technology.

In an embodiment, in the step of synchronizing the plural wireless devices, a specified wireless device acquires the device identification codes corresponding to the wireless devices excluding the specified wireless device and acquires an information about the flag time slot corresponding to the specified wireless device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
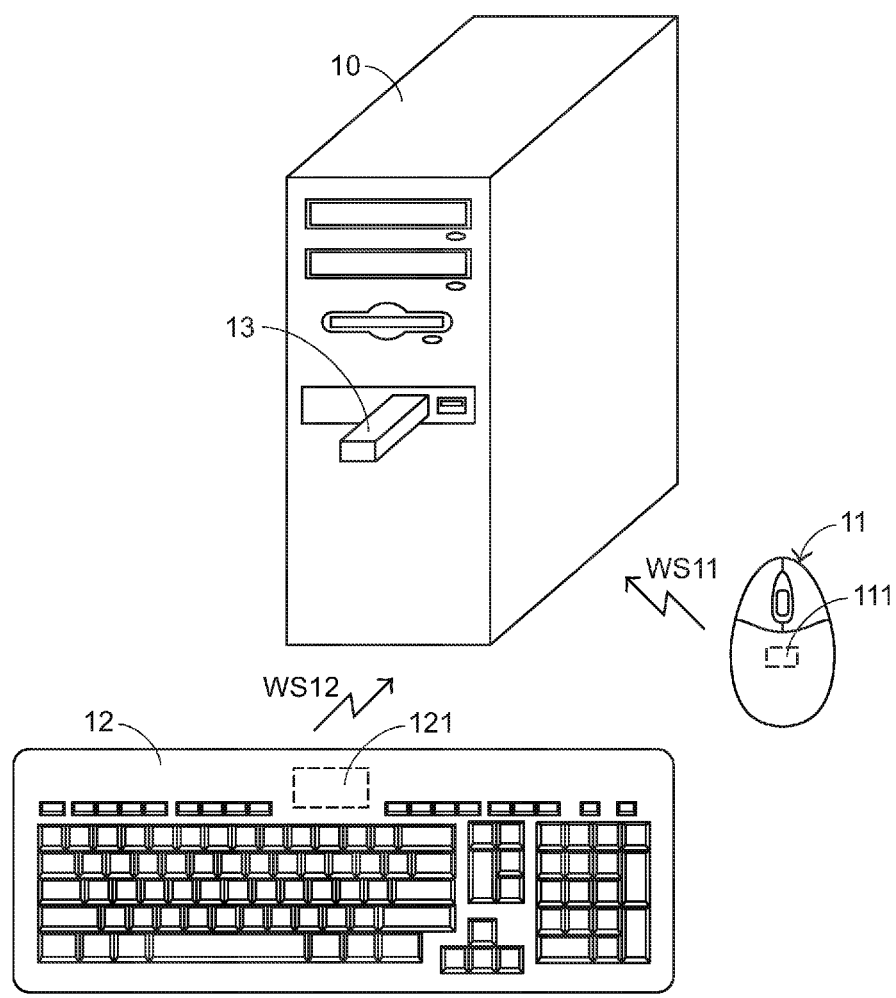
FIG. 1 schematically illustrates the architecture of a conventional wireless transmission system.
Figure 2:
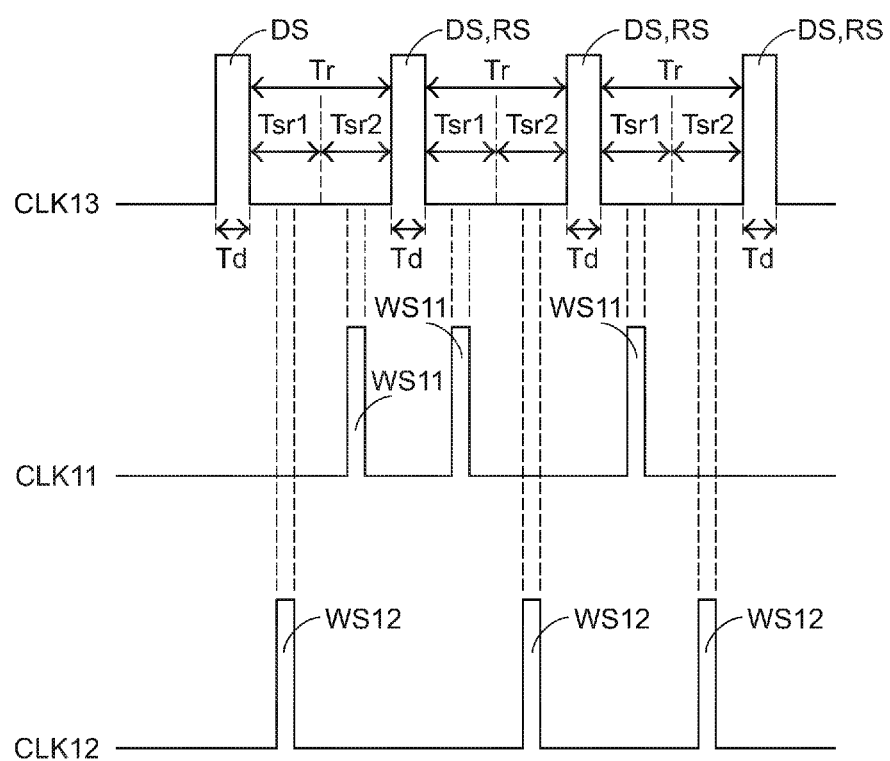
FIG. 2 schematically illustrates the timing of generating related signals in the conventional wireless transmission system.
Figure 3:
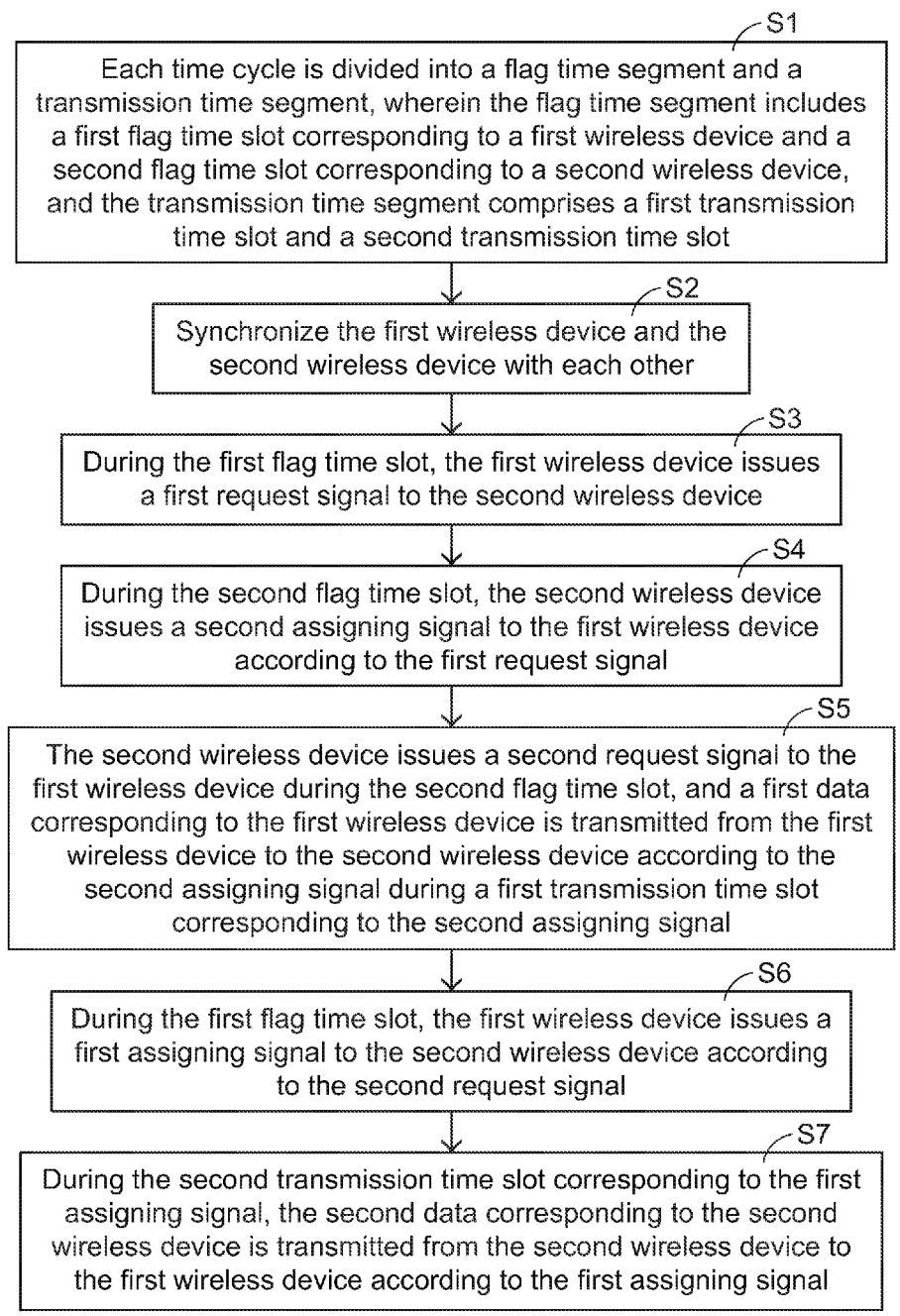
FIG. 3 is a flowchart illustrating a wireless transmission method according to a first embodiment of the present invention.

For obviating the drawbacks encountered from the prior art, the present invention provides a wireless transmission method. FIG. 3 is a flowchart illustrating a wireless transmission method according to a first embodiment of the present invention. Firstly, in the step S1, each time cycle is divided into a flag time segment and a transmission time segment, wherein the flag time segment includes a first flag time slot corresponding to a first wireless device and a second flag time slot corresponding to a second wireless device, and the transmission time segment comprises a first transmission time slot and a second transmission time slot. Then, in the step S2, the first wireless device and the second wireless device are synchronized with each other. In the step S3, the first wireless device issues a first request signal to the second wireless device during the first flag time slot. In the step S4, the second wireless device issues a second assigning signal to the first wireless device according to the first request signal during the second flag time slot. In the step S5, the second wireless device issues a second request signal to the first wireless device during the second flag time slot, and a first data corresponding to the first wireless device is transmitted from the first wireless device to the second wireless device according to the second assigning signal during a first transmission time slot corresponding to the second assigning signal. In the step S6, the first wireless device issues a first assigning signal to the second wireless device according to the second request signal during the first flag time slot. In the step S7, the second data corresponding to the second wireless device is transmitted from the second wireless device to the first wireless device according to the first assigning signal during the second transmission time slot corresponding to the first assigning signal.

Figure 4:
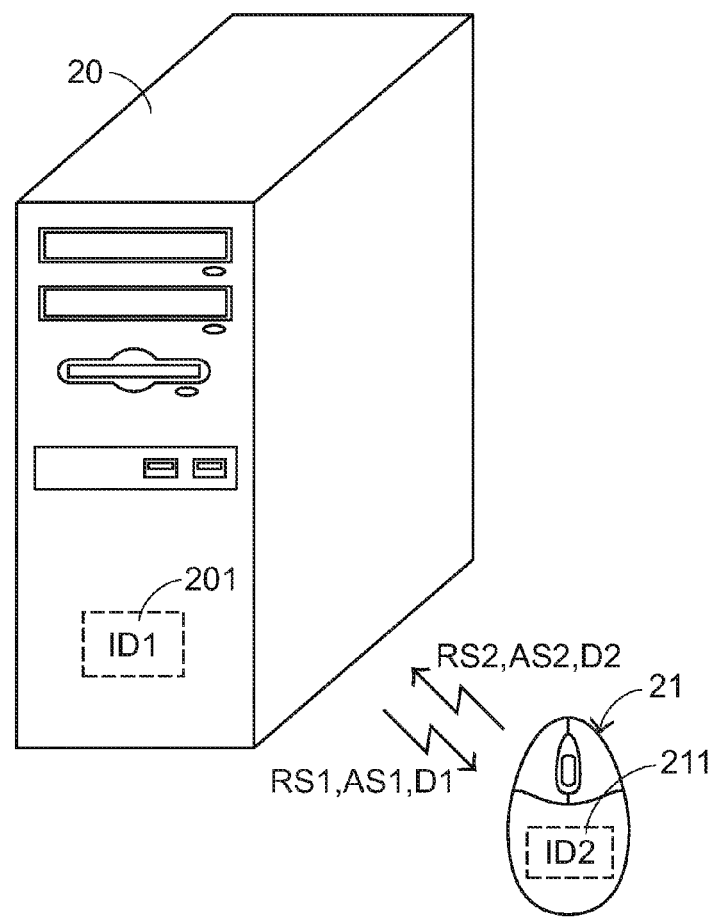
FIG. 4 schematically illustrates the architecture of a wireless transmission system according to a first embodiment of the present invention.

Hereinafter, a wireless transmission system using the wireless transmission method of the present invention will be illustrated with reference to FIG. 4. FIG. 4 schematically illustrates the architecture of a wireless transmission system according to a first embodiment of the present invention. The wireless transmission system 2 comprises a first wireless device 20 and a second wireless device 21. The first wireless device 20 comprises a first wireless device controlling unit 201. The first wireless device controlling unit 201 is used for controlling the first wireless device 20 to issue signals or output data in response to a corresponding signal during a first flag time slot Tf1 of a time cycle (see FIG. 5). In addition, a first device identification code ID1 corresponding to the first wireless device 20 is previously set in the first wireless device controlling unit 201. The second wireless device 21 comprises a second wireless device controlling unit 211. The second wireless device controlling unit 211 is used for controlling the second wireless device 21 to issue signals or output data in response to a corresponding signal during a second flag time slot Tf2 of the time cycle (see FIG. 5). In addition, a second device identification code ID2 corresponding to the second wireless device 21 is previously set in the second wireless device controlling unit 211. In this embodiment, the first wireless device 20 is a computer host, and the second wireless device 21 is a wireless mouse. The first wireless device controlling unit 201 and the second wireless device controlling unit 211 are both wireless device microchips. Moreover, according to the settings, each of the first wireless device controlling unit 201 and the second wireless device controlling unit 211 is capable of issuing signals and receiving signals.

Figure 5:
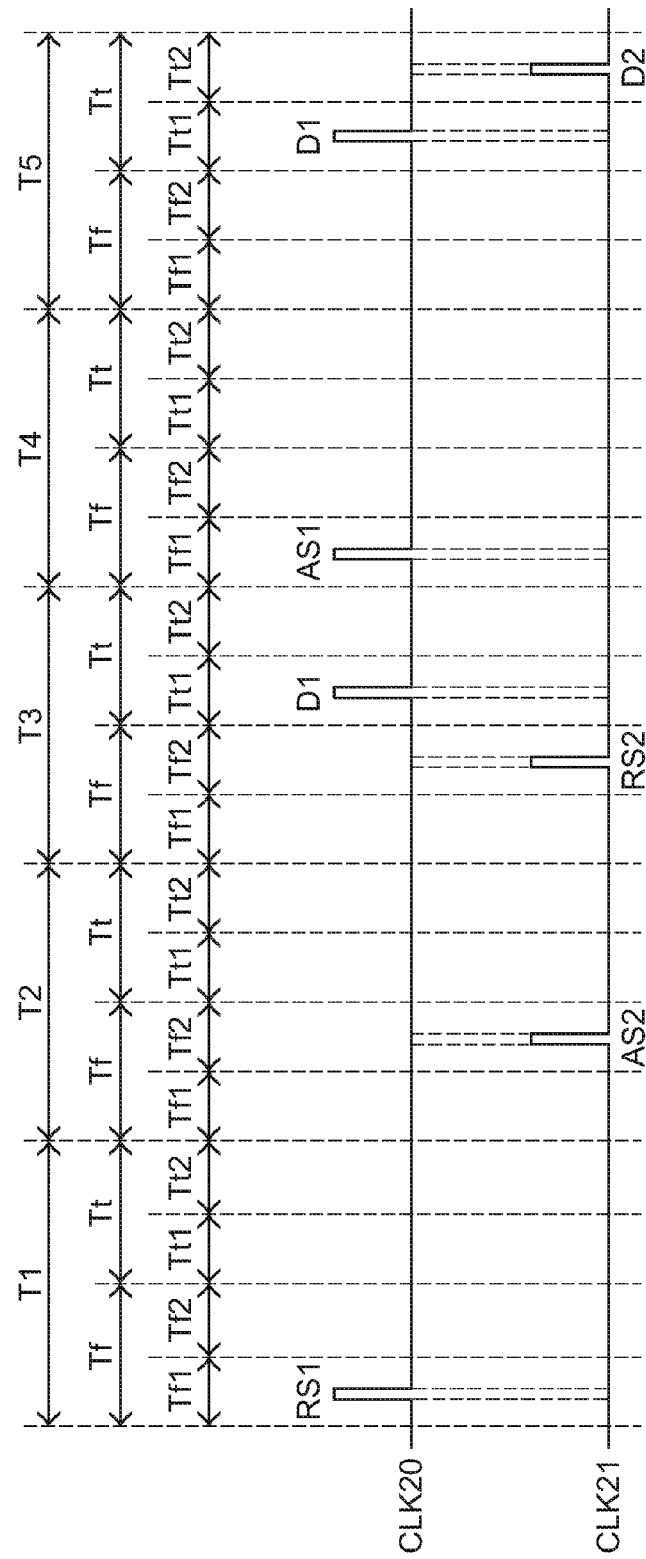
FIG. 5 schematically illustrates the timing of generating related signals by implementing the wireless transmission method in the wireless transmission system according to the first embodiment of the present invention.

Hereinafter, the implementation of the wireless transmission method by the wireless transmission system will be illustrated with reference to FIGS. 4 and 5. FIG. 5 schematically illustrates the timing of generating related signals by implementing the wireless transmission method in the wireless transmission system according to the first embodiment of the present invention. Firstly, the time cycle used in the wireless transmission method will be described. In FIG. 5, plural time cycles T1~T5 are shown. Each of the time cycles includes a flag time segment Tf and a transmission time segment Tt. Since there are two wireless devices in this embodiment, each flag time segment Tf is divided into two flag time slots, and each transmission time segment Tt is divided into two transmission time slots. That is, each flag time segment Tf includes a first flag time slot Tf1 and a second flag time slot Tf2, and each transmission time segment Tt includes a first transmission time slot Tt1 and a second transmission time slot Tt2. During the flag time segment Tf, the first wireless device 20 and the second wireless device 21 are in communication with each other to confirm which wireless device outputs data and which wireless device receives the data, so that the dynamic behavior of each wireless device is updated. Moreover, the first flag time slot Tf1 corresponds to the first wireless device 20, and the second flag time slot Tf2 corresponds to the second wireless device 21. After the first wireless device 20 and the second wireless device 21 are in communication with each other, the first wireless device 20 and the second wireless device 21 may output data during the transmission time segment Tt.

In this embodiment, the first wireless device controlling unit 201 is set to control the first wireless device 20 to issue a first request signal RS1 or a first assigning signal AS1 during the first flag time slot Tf1. Moreover, the first wireless device controlling unit 201 is also set to control the first wireless device 20 to output a first data D1 during the first transmission time slot Tt1. The second wireless device controlling unit 211 is set to control the second wireless device 21 to issue a second request signal RS2 (see FIG. 5) or a second assigning signal AS2 during a second flag time slot Tf2. The second wireless device controlling unit 211 is also set to control the second wireless device 21 to output a second data D2 during the second transmission time slot Tt2.

The operations of the wireless transmission method of the present invention will be illustrated in more details as follows. After the wireless transmission system 2 is enabled, each time cycle T is divided into a flag time segment Tf and a transmission time segment Tt by both of the first wireless device controlling unit 201 and the second wireless device controlling unit 211. In addition, the first wireless device controlling unit 201 is set to control the first wireless device 20 to output signals or data during a first flag time slot Tf1 of the flag time segment Tf, and the second wireless device controlling unit 211 is set to control the second wireless device 21 to output signals or data during the second flag time slot Tf2 of the flag time segment Tf (i.e. in the step S1). In this embodiment, both of the first wireless device 20 and the second wireless device 21 output signals and corresponding data according to a home radio frequency (HRF) technology.

Then, the first wireless device 20 and the second wireless device 21 are synchronized with each other (i.e. in the step S2). Consequently, the second device identification code ID2 corresponding to the second wireless device 21 is acquired by the first wireless device 20, and the first device identification code ID1 corresponding to the first wireless device 20 is acquired by the second wireless device 21. At the same time, the information about the second flag time slot Tf2 corresponding to the second wireless device 21 is acquired by the first wireless device 20, and the information about the first flag time slot Tf1 corresponding to the first wireless device 20 is acquired by the second wireless device 21.

The subsequent operations of the wireless transmission system 2 will be illustrated with reference to FIG. 5. During the first flag time slot Tf1 of the first time cycle T1, the first wireless device 20 issues a first request signal RS1 to the second wireless device 21 (i.e. in the step S3). The first request signal RS1 contains the second device identification code ID2 corresponding to the second wireless device 21. Whereas, during the first flag time slot Tf1 of the first time cycle T1, the first request signal RS1 is received by the second wireless device 21. According to the transmission request and the second device identification code ID2 of the first request signal RS1, the second wireless device 21 realizes that the first wireless device 20 is ready to transmit data to the second wireless device 21.

During the second flag time slot Tf2 of the next time cycle (i.e. the second time cycle T2), the second wireless device 21 issues a second assigning signal AS2 to the first wireless device 20 according to the first request signal RS1 (i.e. in the step S4). The second assigning signal AS2 contains the information about the first device identification code ID1 corresponding to the first wireless device 20 and the first transmission time slot Tt1. Whereas, during the second flag time slot Tf2 of the second time cycle T2, the second assigning signal AS2 is received by the first wireless device 20. In addition, according to the assigning command and the first device identification code ID1 of the second assigning signal AS2, the first wireless device 20 realizes that the first transmission time slot Tt1 is assigned to the first wireless device 20 by the second wireless device 21.

During the second flag time slot Tf2 of the next time cycle (i.e. the third time cycle T3), the second wireless device 21 issues a second request signal RS2 to the first wireless device 20. The second request signal RS2 contains the first device identification code ID1 corresponding to the first wireless device 20. In addition, the second request signal RS2 is received by the first wireless device 20 during the second flag time slot Tf2 of the third time cycle T3. During the first transmission time slot Tt1 of the third time cycle T3, a first data D1 corresponding to the first wireless device 20 is transmitted from the first wireless device 20 to the second wireless device 21 according to the second assigning signal AS2 (i.e. in the step S5).

Next, during the first flag time slot Tf1 of the next time cycle (i.e. the fourth time cycle T4), the first wireless device 20 issues a first assigning signal AS1 to the second wireless device 21 according to the second request signal RS2 (i.e. in the step S6). The first assigning signal AS1 contains the information about the second device identification code ID2 corresponding to the second wireless device 21 and the second transmission time slot Tt2. In addition, during the first flag time slot Tf1 of the fourth time cycle T4, the first assigning signal AS1 is received by the second wireless device 21. According to the assigning command and the second device identification code ID2 of the first assigning signal AS1, the second wireless device 21 realizes that the second transmission time slot Tt2 is assigned to the second wireless device 21 by the first wireless device 20.

Afterward, if the first wireless device 20 is ready for transmit the first data D1 to the second wireless device 21 during the next time cycle (i.e. the fifth time cycle T5), since the first wireless device 20 and the second wireless device 21 have been in communication with each other during the first time cycle T1 and the second time cycle T2 and the assigned first transmission slot Tt1 has not been used, the first data D1 can be directly transmitted from the first wireless device 20 to the second wireless device 21 during the first transmission time slot Tt1 of the fifth time cycle T5. Under this circumstance, since the communication between the first wireless device 20 and the second wireless device 21 is not changed, it is not necessary for the first wireless device 20 to issue the first request signal RS1. In addition, during the second transmission time slot Tt2 of the fifth time cycle T5, the second data D2 corresponding to the second wireless device 21 is transmitted from the second wireless device 21 to the first wireless device 20 according to the first assigning signal AS1 (i.e. in the step S7). Meanwhile, the data transmission between both wireless devices of the wireless transmission system 2 is finished.

The first embodiment has three special features. Firstly, when the first request signal RS1 is received by the second wireless device 21 during the first flag time slot Tf1, since the second wireless device 21 and the first wireless device 20 have been synchronized with each other, the second wireless device 21 realizes that only the first wireless device 20 is permitted to issue signals or data during the first flag time slot Tf1. Consequently, the second wireless device 21 can judge that the first request signal RS1 is outputted from the first wireless device 20. The process of receiving the second assigning signal AS2 by the first wireless device 20 is similar to the above process. Secondly, since the first request signal RS1 outputted from the first wireless device 20 contains the second device identification code ID2 corresponding to the second wireless device 21, the subsequent operations are performed by the second wireless device 21 according to the second device identification code ID2 contained in the signal from the first wireless device 20. The operations of outputting signals from the second wireless device 21 are similar. Thirdly, if the data capacity of the first data D1 is too large to be completely transmitted during the first transmission slot Tt1 of the third time cycle T3, the portion of the first data D1 that has not been transmitted will be continuously transmitted during the first transmission slot Tt1 of the next time cycle (i.e. the third time cycle T4). Similarly, if the data fails to be completely transmitted during the first transmission slot Tt1 of the fourth time cycle T4, the data will be continuously transmitted during the first transmission slot Tt1 of the subsequent time cycles. The rest may be deduced by analogy.

Figure 6:
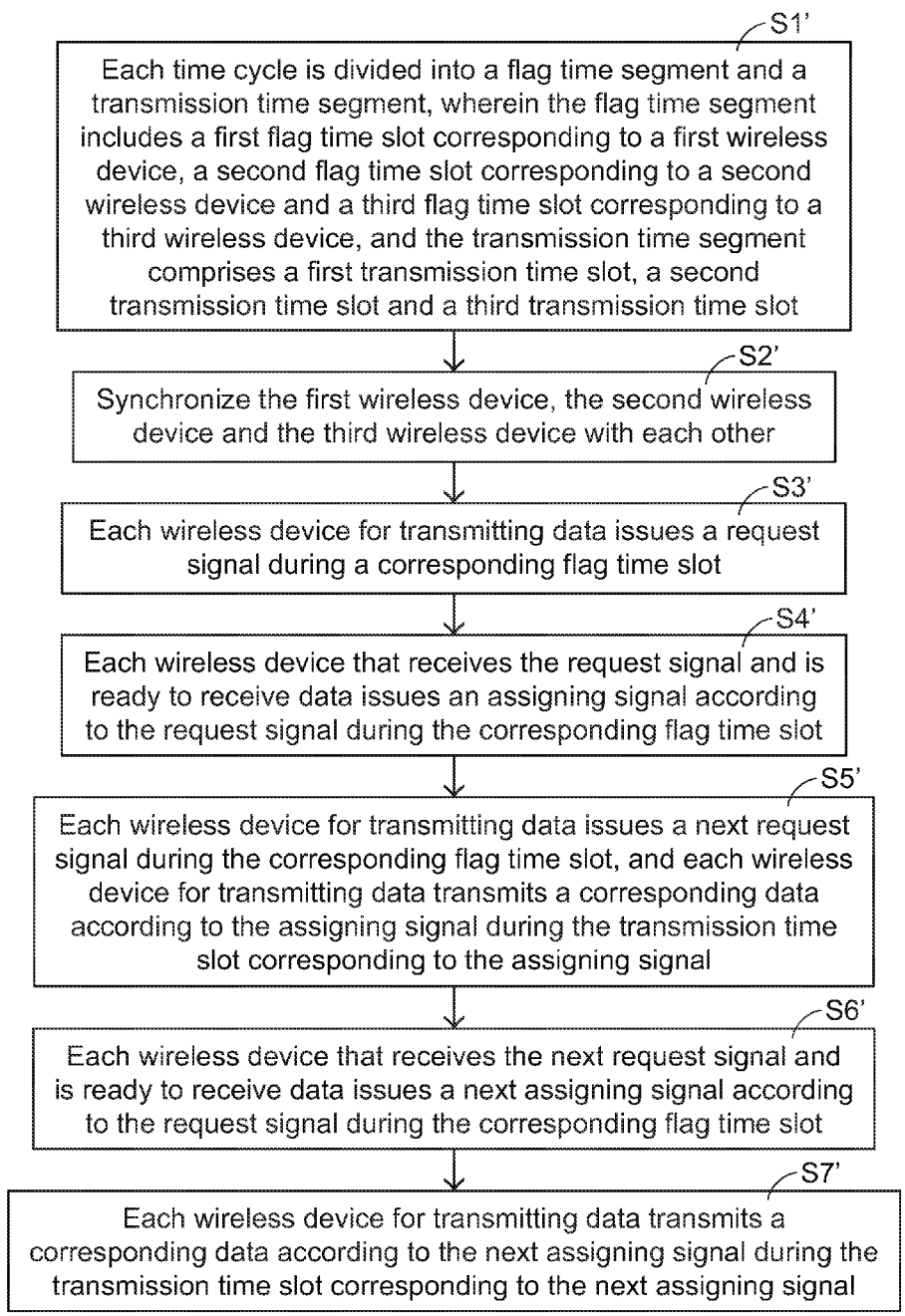
FIG. 6 is a flowchart illustrating a wireless transmission method according to a second embodiment of the present invention.

Moreover, the present invention further comprises a second embodiment. FIG. 6 is a flowchart illustrating a wireless transmission method according to a second embodiment of the present invention. The wireless transmission method comprises steps S1'~S7'. Firstly, in the step S1', each time cycle is divided into a flag time segment and a transmission time segment, wherein the flag time segment includes a first flag time slot corresponding to a first wireless device, a second flag time slot corresponding to a second wireless device and a third flag time slot corresponding to a third wireless device, and the transmission time segment comprises a first transmission time slot, a second transmission time slot and a third transmission time slot. Then, in the step S2', the first wireless device, the second wireless device and the third wireless device are synchronized with each other. In the step S3', each wireless device for transmitting data issues a request signal during a corresponding flag time slot. In the step S4', each wireless device that receives the request signal and is ready to receive data issues an assigning signal according to the request signal during the corresponding flag time slot. In the step S5', each wireless device for transmitting data issues a next request signal during the corresponding flag time slot, and each wireless device for transmitting data transmits a corresponding data according to the assigning signal during the transmission time slot corresponding to the assigning signal. In the step S6', each wireless device that receives the next request signal and is ready to receive data issues a next assigning signal according to the request signal during the corresponding flag time slot. In the step S7', each wireless device for transmitting data transmits a corresponding data according to the next assigning signal during the transmission time slot corresponding to the next assigning signal.

Figure 7:
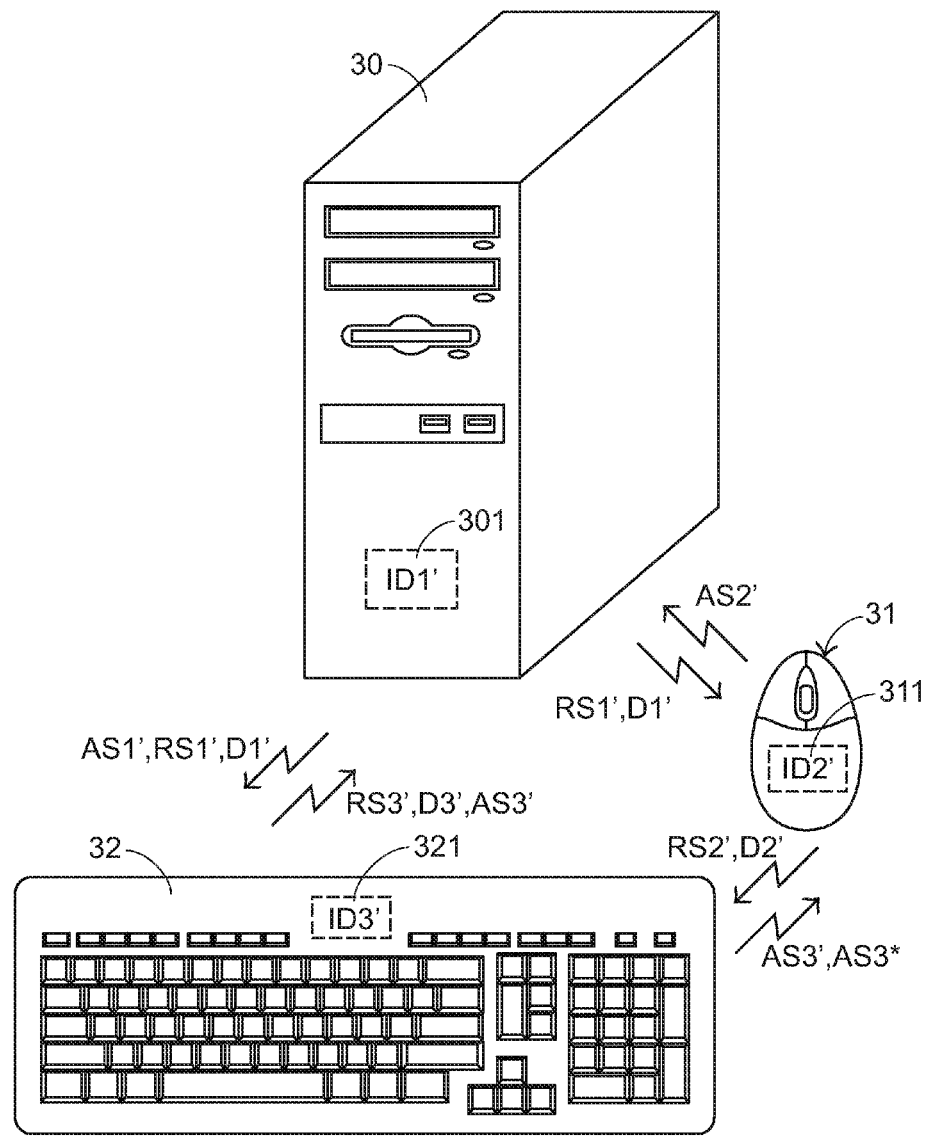
FIG. 7 schematically illustrates the architecture of a wireless transmission system according to a second embodiment of the present invention.

Hereinafter, a wireless transmission system using the wireless transmission method of the present invention will be illustrated with reference to FIG. 7. FIG. 7 schematically illustrates the architecture of a wireless transmission system according to a second embodiment of the present invention. The wireless transmission system 3 comprises a first wireless device 30, a second wireless device 31 and a third wireless device 32. Since there are three wireless devices in this embodiment, the flag time segment Tf' of each of the time cycles T1'~T5' is divided into three flag time slots, and each transmission time segment Tt' is divided into three transmission time slots. That is, each flag time segment Tf' includes a first flag time slot Tf1', a second flag time slot Tf2' and a third flag time slot Tf3', and each transmission time segment Tt' includes a first transmission time slot Tt1', a second transmission time slot Tt2' and a third transmission time slot Tt3' (see FIG. 8).

In the wireless transmission system 3, the first wireless device 30 comprises a first wireless device controlling unit 301. The first wireless device controlling unit 301 is used for controlling the first wireless device 30 to issue signals or output data in response to a corresponding signal during a first flag time slot Tf1' of a time cycle (see FIG. 8). In addition, a first device identification code ID1' corresponding to the first wireless device 30 is previously set in the first wireless device controlling unit 301. The second wireless device 31 comprises a second wireless device controlling unit 311. The second wireless device controlling unit 311 is used for controlling the second wireless device 31 to issue signals or output data in response to a corresponding signal during a second flag time slot Tf2' of the time cycle (see FIG. 8). In addition, a second device identification code ID2' corresponding to the second wireless device 31 is previously set in the second wireless device controlling unit 311. The third wireless device 32 comprises a third wireless device controlling unit 321. The third wireless device controlling unit 321 is used for controlling the third wireless device 32 to issue signals or output data in response to a corresponding signal during a third flag time slot Tf3' of the time cycle (see FIG. 8). In addition, a third device identification code ID3' corresponding to the third wireless device 32 is previously set in the third wireless device controlling unit 321.

In this embodiment, the first wireless device 30 is a computer host, the second wireless device 31 is a wireless mouse, and the third wireless device 32 is a wireless keyboard. In addition, all of the first wireless device controlling unit 301, the second wireless device controlling unit 311 and the third wireless device controlling unit 321 are wireless device microchips. Moreover, according to the settings, each of the first wireless device controlling unit 301, the second wireless device controlling unit 311 and the third wireless device controlling unit 321 is capable of issuing signals and receiving signals.

Figure 8:
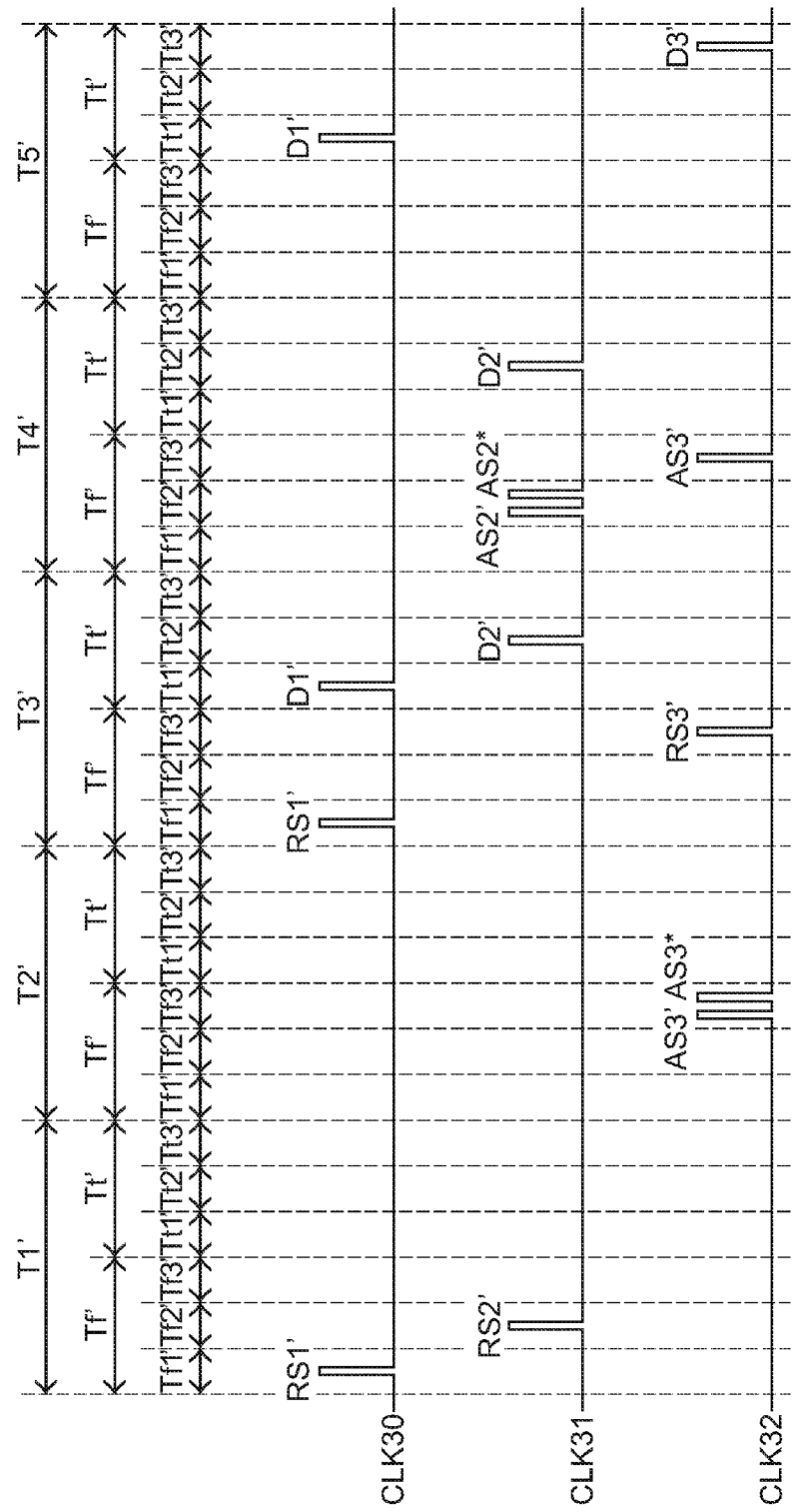
FIG. 8 schematically illustrates the timing of generating related signals by implementing the wireless transmission method in the wireless transmission system according to the second embodiment of the present invention.

Hereinafter, the implementation of the wireless transmission method by the wireless transmission system will be illustrated with reference to FIGS. 7 and 8. FIG. 8 schematically illustrates the timing of generating related signals by implementing the wireless transmission method in the wireless transmission system according to the second embodiment of the present invention. Firstly, the time cycle used in the wireless transmission method will be described. In FIG. 8, plural time cycles T1'~T5' are shown. Each of the time cycles comprises a flag time segment Tf' and a transmission time segment Tt'. Each flag time segment Tf' includes a first flag time slot Tf1', a second flag time slot Tf2' and a third flag time slot Tf3'. Each transmission time segment Tt' includes a first transmission time slot Tt1', a second transmission time slot Tt2' and a third transmission time slot Tt3'. During the flag time segment Tf', the first wireless device 30, the second wireless device 31 and the third wireless device 32 are in communication with each other to confirm which wireless device outputs data and which wireless device receives the data, so that the dynamic behavior of each wireless device is updated. Moreover, the first flag time slot Tf1' corresponds to the first wireless device 30, the second flag time slot Tf2' corresponds to the second wireless device 31, and the third flag time slot Tf3' corresponds to the third wireless device 32. After the first wireless device 30, the second wireless device 31 and the third wireless device 32 are in communication with each other, the first wireless device 30, the second wireless device 31 and the third wireless device 32 may output data during the transmission time segment Tt'.

In this embodiment, the first wireless device controlling unit 301 is set to control the first wireless device 30 to issue a first request signal RS1' (see FIG. 8) or a first assigning signal AS1' during the first flag time slot Tf1'. Moreover, the first wireless device controlling unit 301 is also set to control the first wireless device 30 to output a first data D1' during the first transmission time slot Tt1'. The second wireless device controlling unit 311 is set to control the second wireless device 31 to issue a second request signal RS2' or a second assigning signal AS2' during a second flag time slot Tf2'. The second wireless device controlling unit 311 is also set to control the second wireless device 31 to output a second data D2' during the second transmission time slot Tt2'. The third wireless device controlling unit 321 is set to control the third wireless device 32 to issue a third request signal RS3', an additional third request signal RS3*, a third assigning signal AS3' or an additional third assigning signal AS3* during a third flag time slot Tf3'. The third wireless device controlling unit 321 is also set to control the third wireless device 32 to output a third data D3' during the third transmission time slot Tt3'.

The operations of the wireless transmission method of the present invention will be illustrated in more details as follows. After the wireless transmission system 3 is enabled, each time cycle T' is divided into a flag time segment Tf' and a transmission time segment Tt' by the first wireless device controlling unit 301, the second wireless device controlling unit 311 and the third wireless device controlling unit 321. In addition, the first wireless device controlling unit 301 is set to control the first wireless device 30 to output a signal or a data during a first flag time slot Tf1' of the flag time segment Tf', the second wireless device controlling unit 311 is set to control the second wireless device 31 to output a signal or a data during the second flag time slot Tf2' of the flag time segment Tf', and the third wireless device controlling unit 321 is set to control the third wireless device 32 to output a signal or a data during the third flag time slot Tf3' of the flag time segment Tf' (i.e. in the step S1'). In this embodiment, the first wireless device 30, the second wireless device 31 and the third wireless device 32 output signals and corresponding data according to a home radio frequency (HRF) technology.

Then, the first wireless device 30, the second wireless device 31 and the third wireless device 32 are synchronized with each other (i.e. in the step S2'). Consequently, the second device identification code ID2' corresponding to the second wireless device 31 and the third device identification code ID3' corresponding to the third wireless device 32 are acquired by the first wireless device 30. Similarly, the first device identification code ID1' corresponding to the first wireless device 30 and the third device identification code ID3' corresponding to the third wireless device 32 are acquired by the second wireless device 31. Similarly, the first device identification code ID1' and the second device identification code ID2' are acquired by the third wireless device 32. At the same time, the information about the second flag time slot Tf2' corresponding to the second wireless device 31 and the information about the third flag time slot Tf3' corresponding to the third wireless device 32 are acquired by the first wireless device 30. Similarly, the information about the first flag time slot Tf1' corresponding to the first wireless device 30 and the information about the third flag time slot Tf3' are acquired by the second wireless device 31. Similarly, the information about the first flag time slot Tf1' and the information about the second flag time slot Tf2' are acquired by the third wireless device 32.

The subsequent operations of the wireless transmission system 3 will be illustrated with reference to FIG. 8. After the wireless transmission system 3 is enabled, both of the first wireless device 30 and the second wireless device 31 are ready to transmit data to the third wireless device 32. Consequently, the first wireless device 30 issues a first request signal RS1' to the second wireless device 31 and the third wireless device 32 during the first flag time slot Tf1' of the first time cycle T1', and the second wireless device 31 issues a second request signal RS2' to the first wireless device 30 and the third wireless device 32 during the second flag time slot Tf2' of the first time cycle T1' (i.e. in the step S3'). The first request signal RS1' contains the third device identification code ID3' corresponding to the third wireless device 32. The second request signal RS2' also contains the third device identification code ID3'.

Whereas, during the first flag time slot Tf1' of the first time cycle T1', the first request signal RS1' is received by the second wireless device 31 and the third wireless device 32. According to the transmission request and the third device identification code ID3' of the first request signal RS1', the second wireless device 31 and the third wireless device 32 realize that the first wireless device 30 is ready to transmit data to the third wireless device 32. Similarly, during the second flag time slot Tf2' of the first time cycle T1', the second request signal RS2' is received by the first wireless device 30 and the third wireless device 32. According to the transmission request and the third device identification code ID3' of the second request signal RS2', the first wireless device 30 and the third wireless device 32 realize that the second wireless device 31 is ready to transmit data to the third wireless device 32.

During the third flag time slot Tf3' of the next time cycle (i.e. the second time cycle T2'), the third wireless device 32 issues a third assigning signal AS3' to the first wireless device 30 and the second wireless device 31 according to the first request signal RS1', and the third wireless device 32 issues an additional third assigning signal AS3* to the first wireless device 30 and the second wireless device 31 according to the second request signal RS2' (i.e. in the step S4'). The third assigning signal AS3' contains the information about the first device identification code ID1' corresponding to the first wireless device 30 and the first transmission time slot Tt1'. The additional third assigning signal AS3* contains the information about the second device identification code ID2' corresponding to the second wireless device 31 and the second transmission time slot Tt2'.

Whereas, during the second flag time slot Tf2' of the second time cycle T2', the third assigning signal AS3' is received by the first wireless device 30 and the second wireless device 31. According to the assigning command and the first device identification code ID1' of the third assigning signal AS3', the first wireless device 30 and the second wireless device 31 realize that the first transmission time slot Tt1' is assigned to the first wireless device 30 by the third wireless device 32. Similarly, during the second flag time slot Tf2' of the second time cycle T2', the additional third assigning signal AS3* is received by the first wireless device 30 and the second wireless device 31. According to the assigning command and the second device identification code ID2' of the additional third assigning signal AS3*, the first wireless device 30 and the second wireless device 31 realize that the second transmission time slot Tt2' is assigned to the second wireless device 31 by the third wireless device 32.

Then, the first wireless device 30 is ready to transmit data to the second wireless device 31; the second wireless device 31 is ready to transmit data to the third wireless device 32 again; and the third wireless device 32 is ready to transmit data to the first wireless device 30. Under this circumstance, the first wireless device 30 and the third wireless device need to issue the transmission requests again. Since the communication between the second wireless device 31 and the third wireless device 32 has been established during the first time cycle T1' and the second time cycle T2', the second wireless device 31 can directly transmit data to the third wireless device 32 without the need of issuing the transmission request.

During the first flag time slot Tf1' of the next time cycle (i.e. the third time cycle T3'), the first wireless device 30 issues a first request signal RS1' to the second wireless device 31 and the third wireless device 32. The first request signal RS1' contains the second device identification code ID2' corresponding to the second wireless device 31. During the first flag time slot Tf1' of the third time cycle T3', the first request signal RS1' is received by the second wireless device 31 and the third wireless device 32. During the third flag time slot Tf3' of the third time cycle T3', the third wireless device 32 issues a third request signal RS3' to the first wireless device 30 and the second wireless device 31. The third request signal RS3' contains the second device identification code ID2' corresponding to the second wireless device 31. Whereas, the third request signal RS3' is received by the first wireless device 30 and the second wireless device 31 during the third flag time slot Tf3' of the third time cycle T3'. During the first transmission time slot Tt1' of the third time cycle T3', a first data D1' corresponding to the first wireless device 30 is transmitted from the first wireless device 30 to the third wireless device 32 according to the third assigning signal AS3*. In addition, during the second transmission time slot Tt2' of the third time cycle T3', the second wireless device 31 issues a second data D2' corresponding to the second wireless device 31 to the third wireless device 32 according to the third assigning signal AS3*(i.e. in the step S5').

Then, during the second flag time slot Tf2' of the next time cycle (i.e. the fourth time cycle T4'), the second wireless device 31 issues a second assigning signal AS2' to the first wireless device 30 and the third wireless device 32 according to the first request signal RS1', and the second wireless device 31 issues an additional second assigning signal AS2* to the first wireless device 30 and the third wireless device 32 according to the third request signal RS3'. The second assigning signal AS2' contains the information about the first device identification code ID1' corresponding to the first wireless device 30 and the first transmission time slot Tt1'. The additional second assigning signal AS2* contains the information about the third device identification code ID3' corresponding to the third wireless device 32 and the third transmission time slot Tt3'. Whereas, during the second flag time slot Tf2' of the fourth time cycle T4', the second assigning signal AS2' is received by the first wireless device 30 and the third wireless device 32. In addition, according to the assigning command and the first device identification code ID1' of the second assigning signal AS2', the first wireless device 30 and the third wireless device 32 realize that the first transmission time slot Tt1' is assigned to the first wireless device 30 by the second wireless device 31. Then, the additional second assigning signal AS2* is received by the first wireless device 30 and the third wireless device 32. In addition, according to the assigning command and the third device identification code ID3' of the additional second assigning signal AS2*, the first wireless device 30 and the third wireless device 32 realize that the third transmission time slot Tt3' is assigned to the third wireless device 32 by the second wireless device 31.

During the third flag time slot Tf3' of the fourth time cycle T4', the third wireless device 32 issues the third assigning signal AS3' to the first wireless device 30 and the second wireless device 31 according to the first request signal RS1' (i.e. the step S6'). The third assigning signal AS3' contains the information about the first device identification code ID1' corresponding to the first wireless device 30 and the first transmission time slot Tt1'. Whereas, during the third flag time slot Tf3' of the fourth time cycle T4', the third assigning signal AS3' is received by the first wireless device 30 and the second wireless device 31. In addition, according to the assigning command of the third assigning signal AS3' and the first device identification code ID1', the first wireless device 30 and the second wireless device 31 realize that the first transmission time slot Tt1' is assigned to the first wireless device 30 by the third wireless device 32. During the second transmission time slot Tt2' of the fourth time cycle T4', the second data D2' corresponding to the second wireless device 31 can be directly transmitted to the third wireless device 32 without the need of referring to the request signal.

During the first transmission time slot Tt1' of the next time cycle (i.e. the fifth time cycle T5'), the first data D1' corresponding to the first wireless device 30 is transmitted from the first wireless device 30 to the second wireless device 31 according to the second assigning signal AS2'. In addition, during the third transmission time slot Tt3' of the fifth time cycle T5', a third data D3' corresponding to the third wireless device 32 is transmitted from the third wireless device 32 to the second wireless device 31 according to the additional second assigning signal AS2*(i.e. in the step S7'). Meanwhile, the data transmission between all wireless devices of the wireless transmission system 3 is finished.

In this embodiment, two request signals are received by the third wireless signals during the first time cycle T1'. Meanwhile, the third wireless device controlling unit 321 is set to control the third wireless device 32 to issue the third assigning signal AS3' and the additional third assigning signal AS3*  during the third flag time slot Tf3' of the second time cycle T2'. In other words, the approach of immediately outputting plural request signals is applied to the wireless transmission system with good hardware equipment. In some other embodiments, the third wireless device controlling unit is set to control the third wireless device to issue the third assigning signal during the third flag time slot of the second time cycle and issue the third assigning signal (whose contents are identical to the additional third assigning signal AS3*) during the third flag time slot of the third time cycle. That is, the third wireless device controlling unit is set to control the third wireless device to issue an assigning signal during a flag time slot. This approach may be applied to all wireless transmission systems.

As mentioned above, after the first request signal RS1' is issued by the first wireless device 30, the first request signal RS1' is received by both of the second wireless device 31 and the third wireless device 32. Since the third wireless device 32 needs to perform the subsequent action, the third wireless device 32 should receive the first request signal RS1'. Even if the second wireless device 31 does not need to perform the subsequent action, the first request signal RS1' is also received by the second wireless device 31 because the second wireless device 31 has to update the dynamic behavior of each wireless device to realize which transmission time slots have been used. In such way, the used transmission slots will not be assigned again.

From the above description, since the dynamic behavior of each wireless device is updated before data transmission, the wireless transmission method of the present invention can avoid the data collision problem. The dynamic behavior of each wireless device is updated during the flag time segment. Each flag time slot of the flag time segment is specially assigned to a corresponding wireless device according to the wireless transmission method of the present invention. That is, during each flag time slot, only a signal is issued by a wireless device, but the other wireless devices receives the signal to update the dynamic behaviors thereof. Consequently, the wireless transmission method of the present invention can prevent the communication signals (i.e. the request signals and the assigning signals) from signal collision and prevent the transmitted data from data collision. Moreover, according to the wireless transmission method of the present invention, each wireless device can transmit data to another wireless device. That is, each wireless device has transmitting and receiving capability. As a consequence, the functions of the wireless transmission system are enriched.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless transmission method for use in a wireless transmission system, said wireless transmission system comprising plural wireless devices corresponding to respective plural device identification codes for transmitting data during plural time cycles, said wireless transmission method comprising steps of:

dividing each of said plural time cycles into a flag time segment and a transmission time segment, wherein said flag time segment includes plural flag time slots corresponding to respective wireless devices, and said transmission time segment includes plural transmission time slots;

synchronizing said plural wireless devices with each other;

issuing a transmission request by a first wireless device of said plural wireless devices during a first flag time slot corresponding to said first wireless device, wherein said transmission request contains a second device identification code corresponding to a second wireless device of said plural wireless devices;

issuing an assigning command by said second wireless device according to said transmission request during a second flag time slot corresponding to said second wireless device, wherein said assigning command contains a first device identification code corresponding to said first wireless device; and transmitting said corresponding data from said first wireless device to said second wireless device according to said assigning command during an assigned transmission time slot, wherein after said transmission request is issued by said first wireless device of said plural wireless devices during said first flag time slot corresponding to said first wireless device, said wireless transmission method further comprises steps of:

issuing an additional transmission request by a third wireless device of said plural wireless devices during a third flag time slot corresponding to said third wireless device, wherein said additional transmission request contains said first device identification code corresponding to said first wireless device;

issuing an additional assigning command by said first wireless device according to said additional transmission request during said first flag time slot corresponding to said first wireless device, wherein said additional assigning command contains a third device identification code corresponding to said third wireless device; and transmitting said corresponding data from said third wireless device to said first wireless device according to said additional assigning command during an assigned additional transmission time slot.

2. The wireless transmission method according to claim 1 wherein said transmission request is issued by sending plural request signals during said first flag time slot corresponding to said first wireless device, wherein according to said first flag time slot corresponding to said first wireless device and said second device identification code corresponding to said second wireless device, said plural wireless devices excluding said first wireless device judge that said transmission request is issued to said second wireless device by said first wireless device.

3. The wireless transmission method according to claim 2 wherein said assigning command contains said transmission time slot assigned by said second wireless device, wherein said assigning command is issued by sending plural assigning signals during said second flag time slot corresponding to said second wireless device, wherein according to said plural assigning signals, said plural wireless devices excluding said second wireless device judge that assigned transmission time slot is used.

4. The wireless transmission method according to claim 3 wherein said plural request signals and corresponding data are issued by said first wireless device according to a home radio frequency technology, and said plural assigning signals are issued by said second wireless device according to said home radio frequency technology.

5. The wireless transmission method according to claim 1 wherein said additional transmission request is issued by sending plural additional request signals during said third flag time slot corresponding to said third wireless device, wherein according to said third flag time slot corresponding to said third wireless device and said first device identification code corresponding to said first wireless device, said plural wireless devices excluding said third wireless device judge that said additional transmission request is issued to said first wireless device by said third wireless device.

6. The wireless transmission method according to claim 5 wherein said additional assigning command contains said additional transmission time slot assigned by said first wireless device, wherein said additional assigning command is issued by sending plural additional assigning signals during said first flag time slot corresponding to said first wireless device, wherein according to said plural assigning signals, said plural wireless devices excluding said first wireless device judge that assigned additional transmission time slot is used.

7. The wireless transmission method according to claim 6 wherein said plural request signals, said plural additional request signals and corresponding data are issued by said first wireless device according to a home radio frequency technology, said plural assigning signals are issued by said second wireless device according to said home radio frequency technology, and said plural additional request signals and corresponding data are issued by said third wireless device according to said home radio frequency technology.

8. The wireless transmission method according to claim 1 wherein in said step of synchronizing said plural wireless devices, a specified wireless device acquires said device identification codes corresponding to said wireless devices excluding said specified wireless device and acquires an information about a specified flag time slot corresponding to said specified wireless device.

* * * * *